United States Patent Office 3,627,536
Patented Dec. 14, 1971

3,627,536
METHOD OF PRODUCING PROTEINACEOUS FIBERS
Tetsuo Arima, Ikeda, Osaka, and Yoichi Harada, Kawanishi, Hyogo, Japan, assignors to General Foods Corporation, White Plains, N.Y.
No Drawing. Filed Nov. 4, 1968, Ser. No. 773,307
Int. Cl. A23l 1/20
U.S. Cl. 99—17                                    6 Claims

ABSTRACT OF THE DISCLOSURE

Proteinaceous fibers useful in the preparation of simulated meat products are formed by the steps of controlling the rate of addition of a coagulating solution to a solution of alginate salt and suspension of protein while it is being rapidly stirred in one rotational direction, adding an acid coagulation-accelerating solution, boiling the coagulated material, and washing the boiled coagulum to remove the unreacted protein, excess coagulating solution and coagulation-accelerating solution.

BACKGROUND OF THE INVENTION

The formation of proteins from a variety of sources such as soybeans, wheat, peanuts, egg albumen, and milk into fiber form and the subsequent blending of the fibers with other ingredients such as proteins (in non-fiber form), fats, condiments, and coloring to prepare simulated meats is well known in the art. The fiber form of the protein is necessary to give the simulated meat the proper texture, or resistance to biting to approximate natural meat products. The proper selection of protein and proportions of fats, spices, and coloring allows the production of alternate compositions which are similar in flavor to any of a number of meats such as beef, pork or chicken.

Protein fibers for this purpose have previously been produced by spinning a protein suspension through a spinnerette into a coagulating bath, viz Boyer U.S. Pat. No. 2,682,466. This method, although it provides uniform fibers, is not completely satisfactory, since it requires expensive spinning equipment and produces fibers which are soft and therefore break apart too readily. The present invention is concerned with alleviating these disadvantages.

SUMMARY OF THE INVENTION

It is an object of this invention to provide a new, relatively inexpensive and efficient method of forming protein fibers.

Another object of this invention is to produce relatively hard and chewy fibers which are suitable for use in simulated meats.

Still a further object of the present invention is the production of protein fibers having no residual taste or odor of the protein coagulating or fixing agents utilized in the preparation.

Another object is the formation of short protein fibers in flake form.

An important object of the invention is the preparation of relatively hard and chewy protein fibers from protein in non-fiber form having a meat-like resistance to biting.

These objects are realized by a process comprising the steps:

(1) Stirring an aqueous suspension of protein containing admixed therewith about 10% to 60% by weight, based on the weight of total solids, of a soluble alginate salt in a blender and gradually adding an aqueous solution of coagulant selected from the group of calcium chloride, calcium phosphate, calcium lactate, calcium gluconate, and calcium sulfate to form a semi-coagulated protein curd. The curd is simultaneously sliced by the rapidly rotating blender blades to form soft fibers of random short length in flake form.

(2) Reducing the pH to about 3.2 to 2.4 with a coagulation-accelerating solution selected from the group of gluconic acid, sulfuric acid, acetic acid, hydrochloric acid, lactic acid and phosphoric acid whereby the semi-coagulated flake type fibers become harder and simultaneously partially dewatered.

(3) Boiling the proteinaceous fibers with the coagulating solution and coagulation-accelerating solution to thermally coagulate the heat-coagulable protein content of the flake type fibers;

(4) Washing the proteinaceous fibers with water to remove the excess coagulating solution and coagulation-acceleration agent;

(5) Boiling the proteinaceous fibers in excess water to leach out any remaining unreacted materials, the excess coagulating solution and the excess coagulation-accelerating solution;

(6) Washing the proteinaceous fibers further with water to the end that the fibers become hard, bland to taste and odorless, having a tendon-like external appearance;

(7) Partially dehydrating the fibers; and (8) Finish drying the fibers.

Proteins found useful in the present process may be derived from any source, for example, soybeans, cottonseed, wheat, peanuts, corn, egg albumen and milk casein. Mixtures thereof may be used also, and such mixtures have been found to result in excellent products.

It was unexpectedly discovered that different ratios of various of these proteins mixed with alginate solutions of varying amounts result in fibers having properties approximating those of certain kinds of meats. Listed in Table I are ratios of various proteins found suitable for simulation of beef, pork and chicken protein fibers.

TABLE I.—FIBER COMPOSITION (PERCENT)

| | Beef-like fibers | Pork-like fibers | Chicken-like fibers |
|---|---|---|---|
| Soybean protein | 20–50 | 50–80 | 40–60 |
| Peanut protein | 5–20 | 5–20 | 10–20 |
| Egg albumen | 5–20 | 5–10 | 10–40 |
| Milk casein | | 5–10 | 5–10 |
| Sodium alginate | 40–60 | 10–20 | 20–40 |

DESCRIPTION OF THE INVENTION

The protein fibers of this invention are preferably made by utilizing a continuous process in a series of tanks, but may be also advantageously manufactured by utilizing a batch technique. While any of the well known apparatus for continuous type tank treating may be employed in the method of this invention, the box-type blender designed by Satake Chemical Machine Seisoku-Sho, Morigughi City,, Osaka, Japan, has been found to be particularly useful. A total treating time of 30 minutes has been found preferable.

In the preferred embodiment of the inventive process, an aqueous protein suspension admixed with a sodium alginate solution having a total solids concentration of about 6 to 12% and a viscosity of about 3000 to 8000 poises is charged into a first tank at a rate of 20 kilograms/min. and stirred in one rotational direction at a uniform rate of 800 to 1800 r.p.m. A 10% calcium chloride solution is sprayed therein at a rate of 10 liter/min. and the charge is stirred for 15 minutes effecting coagulation of the proteins. The proteins are simultaneously sliced by the blender blades upon coagulation and are further sliced by screws into short fiber flakes as they are transported to a second tank.

The first tank is provided, near the outlet thereof, with a nozzle for adding a coagulation-accelerating solution, preferably glacial acetic acid, which is added at a rate of about 1 liter/min.

The mixture of fibers, coagulating solution and coagulation-accelerating solution is transferred at a rate of 4 to 5 kg./min. to a second tank which is steam jacketed.

The raw fibers are boiled in the second tank for 5 min. While being boiled they are stirred at a shaft revolution speed of about 50 to 100 r.p.m. and thereafter introduced into a third tank for washing.

In the preferred embodiment, the third tank consists of front and rear chambers, the front chamber having a draining apparatus whereby the coagulating solution and the coagulation-accelerating solution may be drained off, and the rear chamber consisting of a spray-type water-washing apparatus whereby the fibers may be washed with water for a short period of time. The shaft revolution speed of this third tank is also within the range of about 50 to 100 r.p.m.

After washing with water in the third tank, the fibers are introduced into a steam jacketed fourth tank where the fibers are boiled for about 5 minutes. The fibers are then passed in to a fifth tank, similar to the third tank, for a second simultaneous draining and washing step.

The fibers thus obtained are thereafter dewatered until the water content thereof becomes about 60%, utilizing, for example, a drum dehydrating apparatus of the well know Oliver type. After dewatering the fibers are air dried to a water content of about 50%.

The novel fibers obtained in the process of this inventions are short fibers in flake form of about 1 to 4 millimeters in width and 8 to 20 mm. in length. The inventive fibers exhibit superiority in elasticity and strength to fibers obtained by spinning. In addition, the fibers of this invention are uneven in size, to the end that the properties thereof are remarkably similar to the meat tendon or muscle-like characteristics of natural meats. The amounts of the inventive fibers added to other materials to prepare simulated meat products is discussed in detail hereinbelow in Example 3.

The invention can be best understood by reference to the following specific example, but it is to be understood that the invention is in no way limited by these examples.

Example 1.—Protein fiber production

Utilizing the process and apparatus as described hereinbefore with reference to the preferred embodiment of the process, 3 kg. of soybean protein, 1 kg. of peanut protein, 3 kg. of egg albumen and 3 kg. of sodium alginate were stirred in a blender for 5 minutes, after which 100 liters of water were added and stirred for 20 minutes. The mixture was introduced into the first tank at a rate of 2 kg./min. for a period of 55 min. Five hundred and fifty five liters of an aqueous solution of 10% calcium chloride was concurrently added at a rate of 10 liters/min. while the admix of protein and sodium alginate was being stirred. The curd formed was stirred and sliced for 15 minutes. After stirring and slicing to form soft flake type fibers, fifty-five liters of glacial acetic acid was added, at a rate of about 1 liter/min., to harden the fibers. The flakes (or fibers) obtained were passed into the second tank, wherein the flakes were boiled for about 5 minutes to set the head coagulable protein content of the flakes. After boiling, the aqueous solution of calcium chloride, acetic acid, and the flakes were transferred to the third tank.

In the third tank, the coagulating solution was drained from the flakes (or fibers) and the flakes were then washed with water for about 1 minute using a shower-type washer and thereafter transferred to the fourth tank, wherein the flakes (or fibers) were further boiled for about 5 minutes and, thereafter, transferred to the fifth tank where they were rewashed with water again for about 1 minute.

The flakes (or fibers) from the fifth tank were drum-dewatered to a water content of about 60%; then, on a belt conveyer, passed through an air drying box until the water content was reduced to about 50%. The yield was approximately 20 kg. of fibers having a width of about 1 to 4 mm. and a length of about 8 to 20 mm.

Example 2.—Protein fiber added product

A mixture of 6 kg. peanut protein, 6.7 kg. soybean protein, 10.2 kg. wheat protein, and 4.8 kg. milk casein was kneaded for 2 minutes, after which, 9.4 kg. of lard, 1 liter of water and soybean curd powder, previously mixed and stirred for about 3 minutes, were added to the protein mixture and kneaded for about 2 minutes. To the kneaded mixture was added a mixture of 10.84 kg. of seasoning, 3.2 kg. of a meat flavoring agent, and 0.06 kg. of coloring matter. The resulting mixture was kneaded for about 5 minutes with 14 liters of water.

To the foregoing mixture, 21.8 kg. of the protein fiber produced in accordance with Example 1 was added, and the resulting mixture was kneaded for 10 minutes. The raw dough obtained was extruded into pieces approximately 2 to 4 mm. in diameter and 4 to 10 mm. in length, and slow-dried for 16 minutes at 105° C. The dried dough was ground to a granular size of about 4 to 16 mesh. The ground product obtained had excellent flavor and consistency simulating closely a natural minced beef-like product.

Example 3.—Meat slice like product

Simulated pork meat slices containing both "fat" and "lean" portions were prepared by:

(1) Mixing for 4 minutes 22.0 kg. of protein fiber prepared in accordance with Example 1 with 3.2 kg. of soybean protein, 6.3 kg. of wheat protein, and 3.5 kg. of egg albumen.

(2) Adding a previously creamed mixture of 27.3 kg. of lard and 2.0 liters of water and kneading for about 2 minutes to form the "fat" phase of the simulated pork meat.

(3) Separately blending 57.4 kg. of protein fiber prepared in accordance with Example 1 with 24.5 kg. of seasonings, 5.4 kg. of flavors and 0.1 kg. of color to form the "lean" phase and then blending the "lean" phase with the "fat" phase and kneading for 10 minutes.

(4) The raw dough thus obtained was then rolled into film form (or slice form about 2 to 6 mm. thick). The film was cut into rectangular pieces about 2 x 4 cm. and dehydrated to a water content of 3 to 4% to obtain the product. The product, when heated in hot water for about 4 to 10 minutes, had substantially the same flavor and texture as that of natural meat slices boiled in water.

The fibers of this invention, when added to fat, impart a texture which can be varied by changing the amount of fat to approximate the texture of a number of kinds of meat as shown in the following Table II.

For example, in the production of products similar to ham or bacon, the amount of protein fiber added (dry basis) to protein in non-fiber form (granules) is preferably within the range of 26 to 60% by weight of the total solids (dry basis), while fat content is maintained within the range of about 60 to 30% by weight of the total solids.

TABLE II.—BLENDS OF PROTEINACEOUS FIBERS AND FAT WITH PROTEIN (IN NON-FIBER FORM E.G. GRANULES) TO SIMULATE VARIOUS MEAT TEXTURES

|  | Minced beef-like product | Minced pork-like product | Sliced beef-like product | Sliced pork-like product | Sliced ham or bacon-like product |
|---|---|---|---|---|---|
| Amount of proteinaceous fiber (on dry basis, percent) | 7–20 | 5–15 | 13–35 | 10–28 | 26–60 |
| Amount of fat (percent) | 24–12 | 35–22 | 40–8 | 35–20 | 60–30 |

What is claimed is:

1. The method of preparing proteinaceous fibers comprising the steps of:
    (1) admixing a proteinaceous aqueous suspension with a water soluble alginate salt wherein the total solids content of the admixture is 6 to 12% by weight and the alginate salt content is 10 to 60% of the total solids;
    (2) adding a coagulating agent gradually to the admixture which is being stirred whereby soft fibers are formed;
    (3) adding an acidic coagulation-accelerating agent with continued stirring whereby the fibers are hardened;
    (4) boiling the mixture of said fibers, coagulating agent and coagulation-accelerating agent to coagulate the heat coagulable protein content of the fibers; and
    (5) washing said fibers with water.

2. The method of claim 1 wherein the stirring of the proteinaceous suspension is conducted at 800 to 1800 r.p.m.

3. The method of claim 1 wherein the coagulating agent is calcium chloride solution.

4. The method of claim 1 wherein the coagulation-accelerating agent is acetic acid.

5. The method of claim 1 wherein said protein is selected from the group consisting of soybean protein, peanut protein, wheat protein, egg albumen, milk casein and mixtures thereof.

6. The method of preparing proteinaceous fibers comprising the steps of:
    (1) admixing an aqueous suspension of protein material with a water soluble alginate salt wherein the total solids content of the admixture is 10 to 12% by weight and the amount of alginate salt is 10 to 60% of the total solids;
    (2) adding an aqueous solution of a calcium chloride coagulating agent at a controlled rate to the admixture of proteinaceous suspension and solution of alginate salt which is being stirred at a constant rotational speed in one rotational direction whereby a soft fibrous curd is formed;
    (3) cutting the soft fibrous curd into random short length fibrous flakes during continued stirring to form a suspension of proteinaceous soft fibers oriented in flake form;
    (4) admixing a solution of acetic acid to the proteinaceous suspension to harden the flaky fibers;
    (5) boiling the mixture of said proteinaceous fibers, calcium chloride and acetic acid to coagulate the heat coagulable protein content of the fibers;
    (6) washing said proteinaceous fibers with water; and
    (7) dehydrating the fibers.

References Cited

UNITED STATES PATENTS 2,830,902   4/1958   Anson _____ 99—14
3,093,483   6/1963   Ishler _____ 99—131

RAYMOND N. JONES, Primary Examiner

R. B. ANDEWELT, Assistant Examiner

U.S. Cl. X.R.

99—14, 18, 131

UNITED STATES PATENT OFFICE
CERTIFICATE OF CORRECTION

Patent No. 3,627,536          Dated December 14, 1971

Inventor(s) Tetsuo Arima and Yoichi Harada

It is certified that error appears in the above-identified patent and that said Letters Patent are hereby corrected as shown below:

Column 1, line 53, after "chewy" and before "fibers" insert ---protein---.

Column 2, beginning on line 17 and bridging line 18, change "simulneously" to ---simultaneously---.

Column 4, line 6, change "head" to ---heat---.

Signed and sealed this 6th day of June 1972.

(SEAL)
Attest:

EDWARD M. FLETCHER, JR.
Attesting Officer

ROBERT GOTTSCHALK
Commissioner of Patents